United States Patent [19]
Tadao et al.

[11] Patent Number: 5,829,689
[45] Date of Patent: Nov. 3, 1998

[54] SOLDER SPREADING APPARATUS

[75] Inventors: Okazaki Tadao; Maebara Yoshikazu, both of Hamamatsu, Japan

[73] Assignee: Samsung Aerospace Industries, Ltd., Kyeongsangnam-do, Rep. of Korea

[21] Appl. No.: 788,498

[22] Filed: Jan. 28, 1997

[30] Foreign Application Priority Data

Jan. 29, 1996 [JP] Japan ..................................... 8-012605

[51] Int. Cl.⁶ ................................ B05B 3/14; B05B 3/18
[52] U.S. Cl. ........................................... 239/750; 118/323
[58] Field of Search ................................... 239/750–752, 239/264; 118/323

[56] References Cited

U.S. PATENT DOCUMENTS

| | | | |
|---|---|---|---|
| 60,386 | 12/1866 | Kirk | 239/752 |
| 1,703,384 | 2/1929 | Birkenmaier | 239/DIG. 14 X |
| 4,905,913 | 3/1990 | Frikker | 239/751 |
| 5,266,115 | 11/1993 | Taccon et al. | 239/264 X |
| 5,348,585 | 9/1994 | Weston | 118/323 X |
| 5,449,407 | 9/1995 | Breeden et al. | 118/323 |

*Primary Examiner*—Kevin Weldon
*Attorney, Agent, or Firm*—Finnegan, Henderson, Farabow, Garrett & Dunner, L.L.P.

[57] ABSTRACT

An apparatus for spreading a fluid substance, includes a container containing the fluid substance and a supporting unit. A lower holding unit, connected to the supporting unit, holds a lower end of the container. An upper holding unit, connected to the supporting unit, holds an upper end of the container. A driving unit, connected to the supporting unit, drives the container up or down. A rotating unit, connected to the supporting unit, rotates the container around a vertical axis. Finally, a needle, connected to the lower holding unit, spreads the fluid substance

4 Claims, 6 Drawing Sheets

SOLDER SPREADING APPARATUS

BACKGROUND OF THE INVENTION

1. Field of the Invention

The present invention relates to a solder spreading apparatus. More particularly, the present invention relates to a solder spreading apparatus used to mount electronic parts on a printed circuit board (PCB).

2. Description of the Related Art

An electronic parts mounting device automatically mounts electronic parts (i.e., integrated circuits, large scale integration chips, diodes, condensers, or resistors) on a PCB. The device spreads a fluid substance on the PCB at each position where an electronic part is to be mounted and then presses each electronic parts into the fluid substance. The fluid substance may be a cream solder made by mixing an active solvent, such as flux, with solder powder.

To automatically spread the solder, the device includes a guide rail for guiding the PCB to a desired position, and a stage for supporting the electronic parts. A solder container having a head unit is then moved along the X and Y axes above the guide rail.

Recently, the automatic mounting devices have been included with an air pressure cylinder for moving the solder container. The air pressure cylinder can raise the solder container to a spreading position, according to the movement of the head unit, and can lower the container once the spreading position is reached. However, the air pressure cylinder is not suitable for moving the solder container up and down at high speeds. It is also known to use a rotation module to rotate the solder container. The bottom of the solder container includes one or two needles for spreading the solder cream.

Since the rotation module is moved up and down along with the solder container, the speed at which the air pressure cylinder can move the container is decreased. In other words, the added weight of the rotation module causes a decrease in the speed at which the solder container moves. Consequently, this reduces the manufacturing efficiency of the device.

Furthermore, different sizes of solder containers and supporting modules should be used, depending upon the type of solder. The switching of the different containers and supporting modules causes an increase in the cost and time spent during the manufacturing process.

SUMMARY OF THE INVENTION

An apparatus consistent with the present invention allows a container containing a spreading fluid to move up or down at a high speed.

To achieve these and other advantages, an apparatus for spreading a fluid substance, includes a container containing the fluid substance and a supporting unit. A lower holding unit, connected to the supporting unit, holds a lower end of the container. An upper holding unit, connected to the supporting unit, holds an upper end of the container. A driving unit, connected to the supporting unit, drives the container up or down. A rotating unit, connected to the supporting unit, rotates the container around a vertical axis. Finally, a needle, connected to the lower holding unit, spreads the fluid substance.

According to another aspect of the invention, an apparatus for spreading a fluid substance includes a container containing the fluid substance. The container includes means for spreading the fluid substance. A driving unit drives the container up or down. Also, a rotating unit rotates the container around a vertical axis, wherein the rotating unit is coupled to the container such that the rotating unit does not move up or down when the container is driven up or down.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

Preferred embodiments consistent with the present invention will now be described in detail, with reference to the accompanying drawings.

Figure 1:
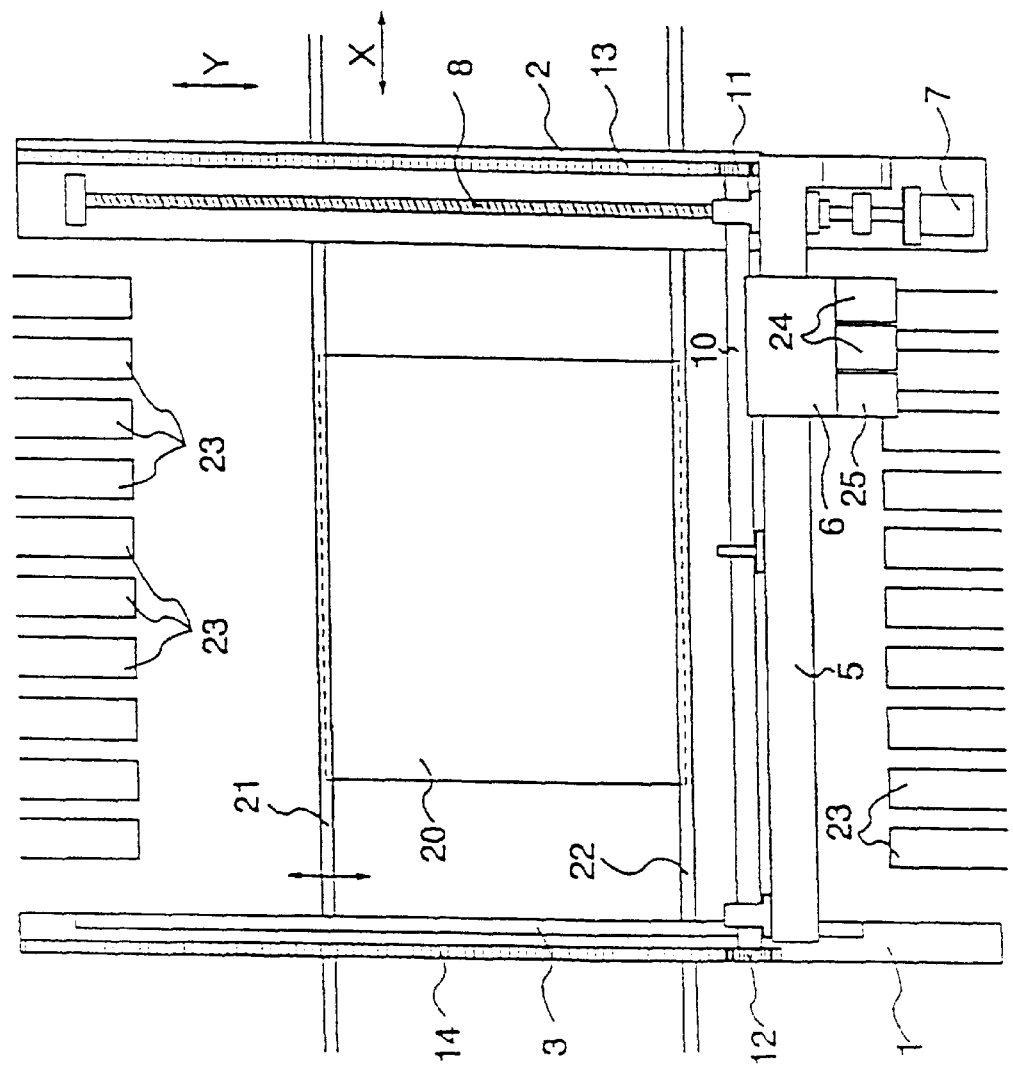
FIG. 1 is a top view of an electronic parts mounting device consistent with the invention.
Figure 2:
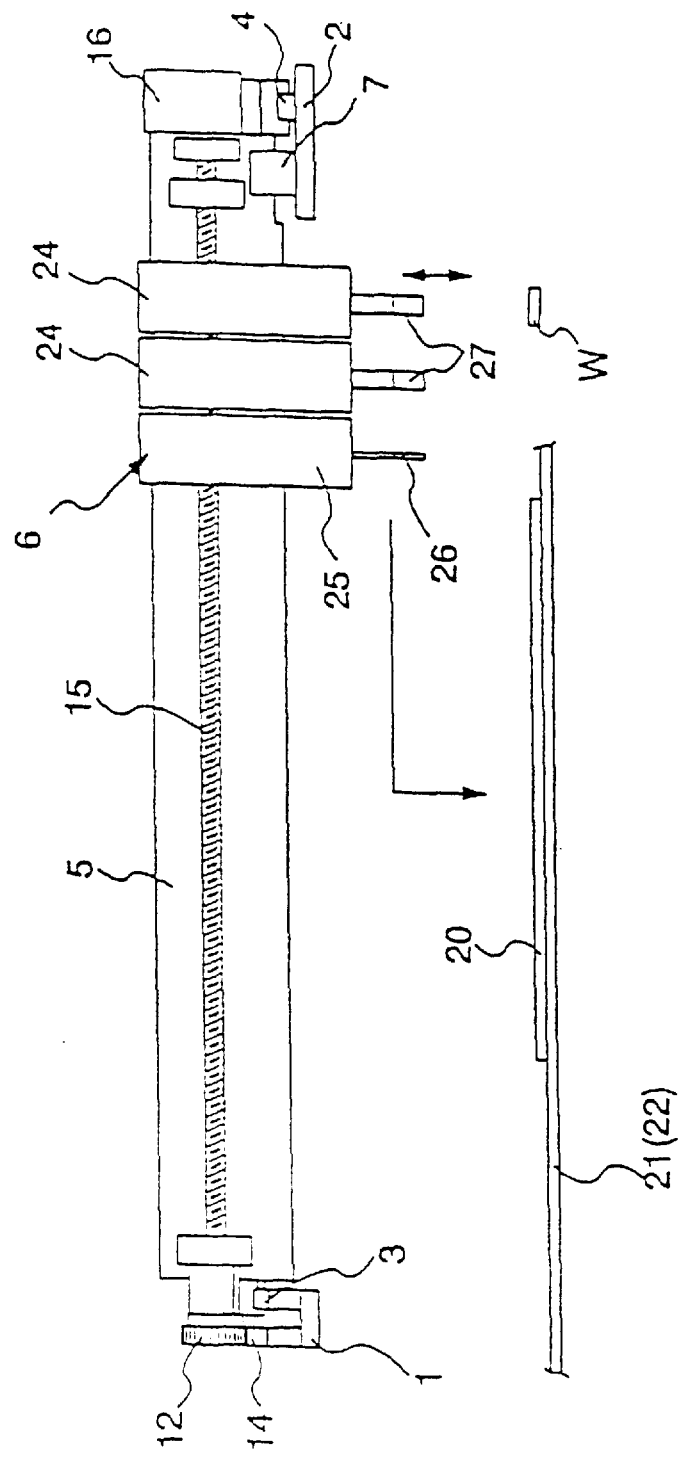
FIG. 2 is a front view of the electronic parts mounting device shown in FIG. 1.

FIG. 1 is a diagram of an electronic parts loading device consistent with the invention, and FIG. 2 is a front view of the device. Referring to FIG. 1, an electronic parts loading device includes horizontal support members 1 and 2 disposed in parallel to one another, each having a respective guide rails 3 and 4. A crossbar 5 extends between and perpendicular to horizontal support members 1 and 2, and moves along guide rails 3 and 4 in the Y axis direction. A head unit 6 slides along crossbar 5 in the X axis direction.

To move crossbar 5 in the Y axis direction, a motor 7 drives a ball screw 8 attached to both support member 2 and one side of crossbar 5. Also, a shaft 10 is mounted in parallel to crossbar 5 and includes, at each end, respective pinion gears 11 and 12. Horizontal support members 1 and 2 also include rack gears 13 and 14, respectively. Accordingly, when drive motor 7 drives ball screw 8, ball screw 8 exerts a force which moves crossbar 5 along the Y axis, and moves pinion gears 11 and 12 along rack gears 13 and 14, respectively. Furthermore, as crossbar 5 moves along the Y axis it remains perpendicular to horizontal support members 1 and 2.

Referring to FIG. 2, a ball screw 15 is provided for moving head unit 6 along the X axis. Ball screw 15 is rotatably mounted to crossbar 5 and coupled to head unit 6. A drive motor 16 drives ball screw 15 through the use of a pulley (not shown), mounted to the main shaft of motor 16, and a timing belt (not shown). The timing belt passes over the pulley and engages ball screw 15.

Guide members 21 and 22 are mounted under and perpendicular to horizontal support members 1 and 2. Guide members 21 and 22 extend past horizontal members 1 and 2, and are used to transport a printed circuit board (PCB) 20 along the X axis. In addition, guide member 21 can move in the Y direction to accommodate differently sized PCBs 20.

On both sides of guide members 21 and 22 are a plurality of parts stages 23. In addition, head unit 6 includes a plurality of loading heads 24 and a spreading portion 25. Spreading portion 25 applies either cream solder or an adhesive material to certain positions on PCB 20. Loading heads 24 then load electronic parts W on the PCB at these locations.

As shown in FIG. 2, spreading portion 25 includes a needle 26 for applying the cream solder, and loading heads 24 each include a suction bit (suction nozzle) 27. Since needle 26 and suction bits 27 are mounted to head 6, they are each able to move along the X and Y axes.

Figure 3:
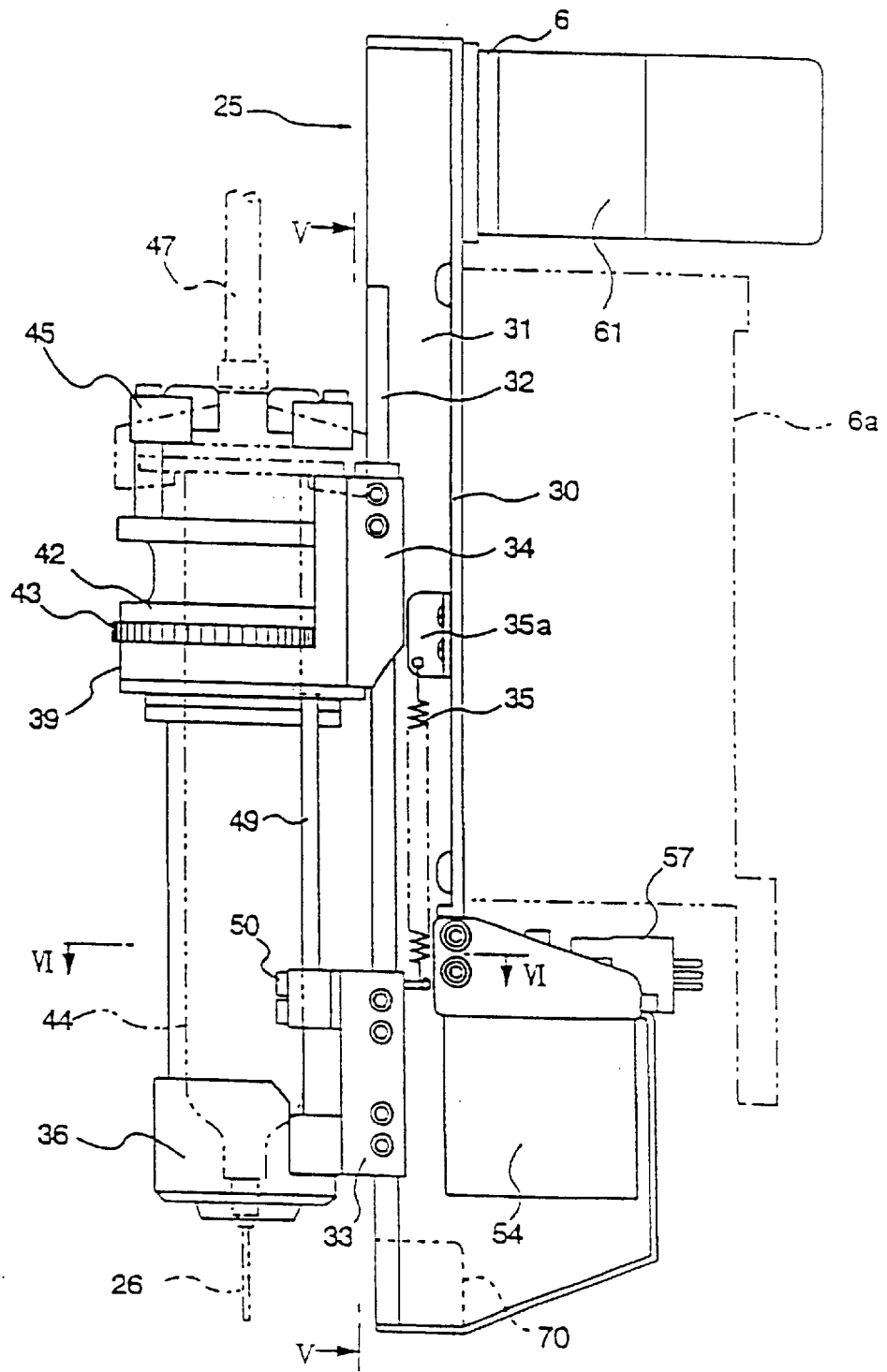
FIG. 3 is an enlarged side view of a spreading apparatus 25 shown in FIGS. 1 and 2.
Figure 4:
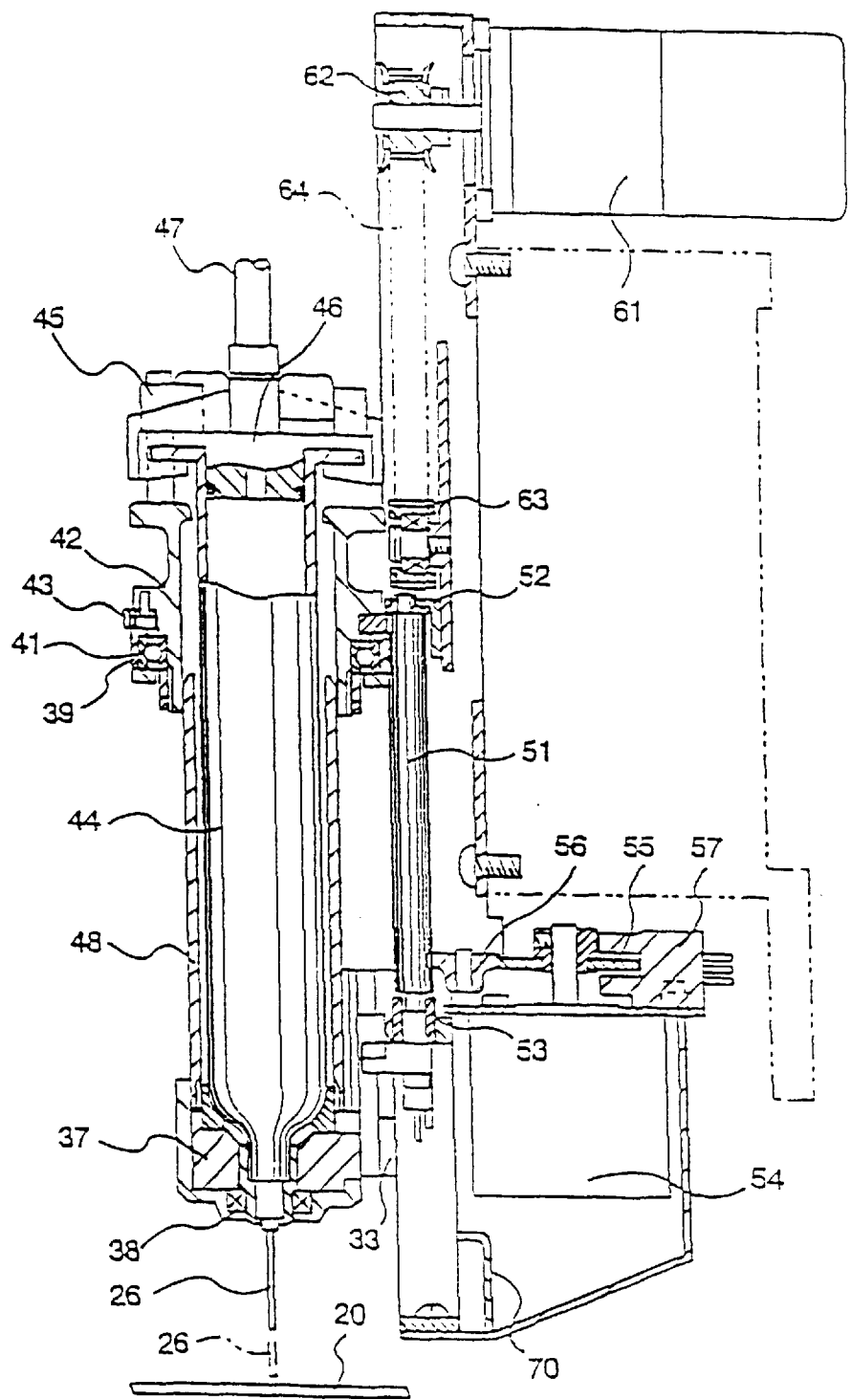
FIG. 4 is a cross-sectional view of the spreading apparatus 25 shown in FIG. 3.

FIG. 3 is an enlarged side view of spreading apparatus 25 shown in FIGS. 1 and 2. Referring to FIG. 3, a support 30 is fixed to a head unit body 6a, which slides along crossbar 5. Support 30 has two ribs 31 (see FIG. 6), each having an end which slides along one of guide rails 32. In addition, a lower slider 33 and an upper slider 34, each of which slide along guide rails 32, are provided. A bracket 35a is fixed to support 30, and a pressure coil spring 35 is mounted between lower slider 33 and bracket 35a and forces lower slider 33 upward. Also connected to lower slider 33 is a lower holder 36, which, as shown in FIG. 4, includes a support block 37 and a radial bearing 38. Referring back to FIG. 3, a retainer 39 having a ring-shaped portion is fixed to upper slider 34. The inside of retainer 39 includes a circular upper holder 42, which rotates on an inside of a radial bearing 41 (see FIG. 4) and connects to a ring-shaped driven gear 43.

Upper and lower holders 42 and 36 support a syringe 44, such that upper holder 42 supports syringe 44 as it is raised, while lower holder 36 supports it as it is lowered. Moreover, pressure coil spring 35 pulls lower holder 36 upward as syringe 44 is lowered. A needle 26 is mounted at a lower end of syringe 44, and discharges the cream solder. Upper holder 42 includes a clamp member 45 and a pressure cap 46. Pressure cap 46 receives pressurized air pulses from a pipe 47 and provides the air pressure to an opening portion in the upper end of syringe 44. The pressurized air pulses delivered to the inside of syringe 44 function to control the amount of solder or adhesive material discharged by needle 26.

Figure 6:
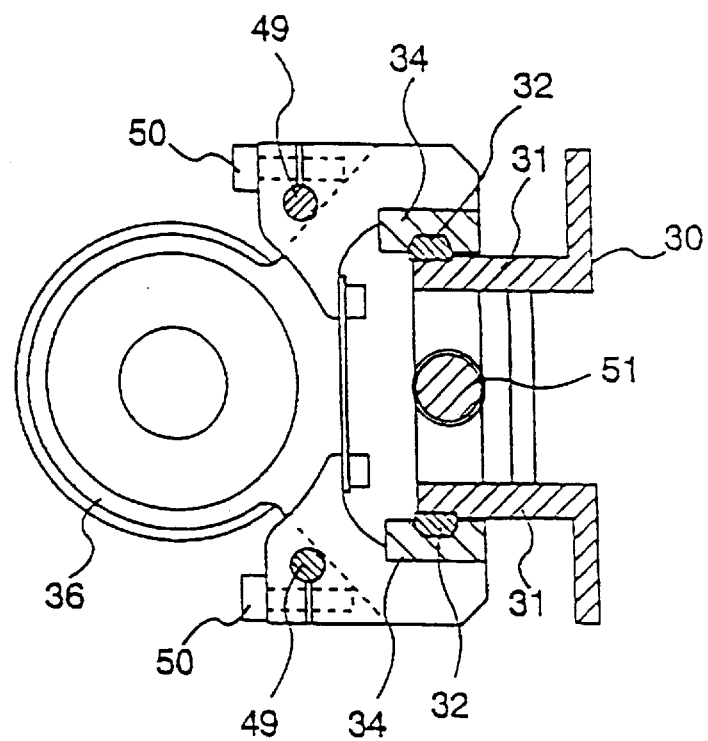
FIG. 6 is a cross sectional view taken along the line VI—VI of FIG. 3.

As shown in FIG. 6, tie rods 49 extend along the length of cylindrical cover 48. The top end of tie rods 49 are mounted to retainer 39, while their lower ends are connected to lower slider 33 by a screw member 50. Screw member 50 can be adjusted to vary the distance between upper and lower holders 42 and 36. By making this adjustment, syringes 44 of different lengths can be used.

In systems consistent with the present invention, syringe 44 can be rotated around a vertical axis. Referring to FIG. 4, a drive gear shaft 51 extends vertically, and mounted on support 30 by upper and lower bearings 52 and 53. Also connected to support 30 is an electric motor 54 for driving gear shaft 51. A shaft of motor 54 connects to a drive gear 55, which meshes with a lower portion of drive gear shaft 51 through the interposition of an idle gear 56. Accordingly, drive gear shaft 51 meshes with driven gear 43, which then rotates upper holder 42, and, in turn, syringe 44 as well. Since drive gear shaft 51 is gear-shaped over its entire surface, the rotation ratio of gear 43 to gear shaft 51 is independent of the vertical position of upper holder 42. Thus, syringe 44 can be rotated when it is in either an upper or lower position. Furthermore, a sensor 57 is connected to support 30 for detecting the rotating angle of drive gear 55 to determine a rotating angle of syringe 44. As shown in FIG. 3, spreading apparatus 25 also includes a support 70.

Figure 5:
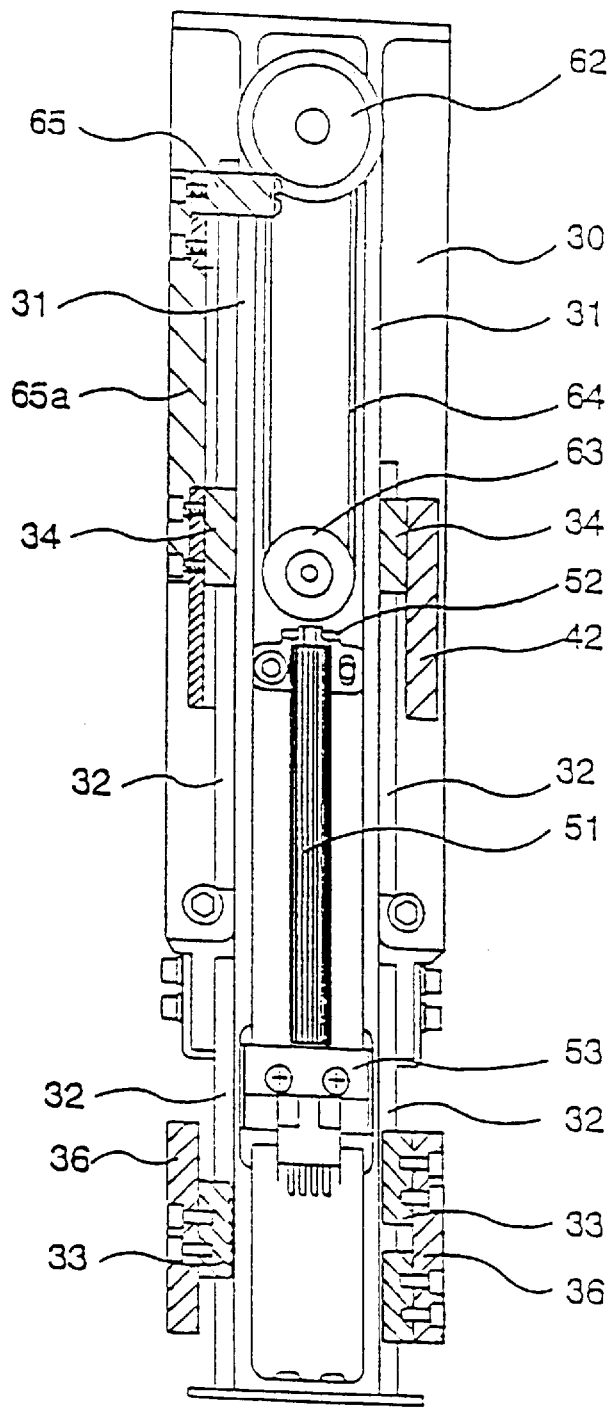
FIG. 5 is a cross-sectional view taken along the line V—V of FIG. 3.

In systems consistent with the present invention, syringe 44 can also be moved in the vertical direction. To this end, an electric motor (upper/lower drive means) 61 is connected to an upper portion of support 30. A shaft of motor 61 is connected to a pulley 62. A timing belt 64 loops around pulley 62 and a second pulley 63, which is rotatably mounted to support 30. As shown in FIG. 5, timing belt 64 also connects to a connecting portion 65, which connects to upper holder 42 by a connecting member 65a. Accordingly, electric motor 61 drives timing belt 64, causing connecting portion 65, and thus upper holder 42 and syringe 44, to ascend or descend in the vertical direction.

Furthermore, motor 61 can drive syringe 44 at speeds higher than those achieved by an air pressure cylinder. This is especially true since, in systems consistent with the invention, motor 61 does not drive the means for rotating syringe 44 (i.e., motor 54). More particularly, motor 54 is installed on support 30, and does not move when syringe 44 is moved in the vertical direction. This reduces the weight that is driven by motor 61, thus making it possible to drive syringe 44 at higher speeds. Furthermore, the overall time for spreading the solder is decreased.

The process of spreading either the cream solder or adhesive on PCB 20 will now be described. First, motor 61 raises syringe 44 and needle 26 so that head unit 6 can be moved to a predetermined spreading position. In particular, motor 7 moves cross bar 5 in the Y direction and motor 16 moves head unit 6 moves in the X direction. When the head unit reaches the predetermined position, motor 61 lowers syringe 44 toward PCB 20. FIG. 4 shows a dotted line illustrating needle 26 in the lowered position.

Syringe 44 moves down until the distance between the end of needle 26 and the surface of PCB 20 is about 0.1–0.3 mm. The pressurized air pulses (not shown) supplied to syringe 44 cause needle 26 to deliver a predetermined amount of cream solder onto PCB 20 at the predetermined spreading position. After syringe 44 has finished spreading the cream solder, motor 61 drives syringe 44 upward to a predetermined rising position.

Head unit 6 then moves to one of part stages 23, and loading head 24 lowers suction bit 27 into part stage 23 to pick up an electronic part W. Suction bit 27 carries the electronic part W to the predetermined spreading position and mounts part W on PCB 20. If the electronic part has leads to be fixed within a socket on PCB 20, then spreading apparatus 25 is not used. However, loading head 24 and suction bit 27 may be used to move the electronic part to the mounting position.

Systems consistent with the present invention can accommodate various types of syringes 44. For instance, if syringe 44 has two needles 26, motor 54 should rotate syringe 44 to change the positions of the two needles. Also, syringe 44 can be easily replaced by first removing pressurized cap 46, and then removing syringe 44 from upper and lower holders 42 and 36. Furthermore, since syringe 44 is supported by separate upper and lower holders 42 and 36, syringes of varying lengths can be used. The only limitation on the size of syringe 44 is that it be smaller in diameter than cylindrical cover 48. The fact that the center of syringe 44 is set at pressurized cap 46 makes it possible to use syringes having different outer diameters. Finally, upper and lower holders 42 and 36 provide a stable support for syringe 44.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents. For example, spreading apparatus 25 may be installed to move along any one axis or direction. Furthermore, the number of loading heads 24 may be more than two.

What is claimed is:

1. An apparatus for spreading a fluid substance, comprising:
   a container containing the fluid substance and including means for spreading the fluid substance;
   a driving unit for driving the container up and down;
   a rotating unit for rotating the container around a vertical axis, wherein the rotating unit is coupled to the container such that the rotating unit does not move up and down as the container is driven up and down;
   a lower holding unit for holding a lower end of the container;
   an upper holding unit for holding an upper end of the container; and
   a tie rod connecting the lower holding unit to the upper holding unit, wherein the distance between the upper and lower holding unit can be adjusted by adjusting the tie rod.

2. An apparatus for spreading a fluid substance, comprising:
   a container containing the fluid substance;
   a supporting unit;
   a lower holding unit, connected to the supporting unit, for holding a lower end of the container;
   an upper holding unit, connected to the supporting unit, for holding an upper end of the container;
   a driving unit, connected to the supporting unit, for driving the container up and down;
   a rotating unit, connected to the supporting unit, for rotating the container around a vertical axis; and
   a needle, connected to the lower holding unit, for spreading the fluid substance.

3. The apparatus of claim 2, further comprising:
   a tie rod connecting the lower holding unit to the upper holding unit, and wherein the distance between the upper and lower holding unit can be adjusted by adjusting the tie rod.

4. The apparatus of claim 2, wherein:
   the rotating unit and the driving unit each comprise a motor.

* * * * *

UNITED STATES PATENT AND TRADEMARK OFFICE
CERTIFICATE OF CORRECTION

PATENT NO.     : 5,829,689                              Page 1 of 1
DATED          : November 3, 1998
INVENTOR(S)    : Tadao Okazaki et al.

It is certified that error appears in the above-identified patent and that said Letters Patent is hereby corrected as shown below:

Title page,
Item [57], delete the Abstract in its entirety and substitute therefor the attached Abstract.

Signed and Sealed this

Eighteenth Day of September, 2001

*Attest:*

Nicholas P. Godici

NICHOLAS P. GODICI
*Attesting Officer*     *Acting Director of the United States Patent and Trademark Office*